(12) United States Patent  (10) Patent No.: US 7,525,979 B2
Sumer et al.                (45) Date of Patent:     Apr. 28, 2009

(54) NETWORK INTERFACE DEVICE HAVING IMPROVED THERMAL PROPERTIES

(75) Inventors: Suleyman Oguz Sumer, Raleigh, NC (US); Deborah H. Heller, Raleigh, NC (US); Christopher Tad Ammann, Raleigh, NC (US); James Xavier Torok, Raleigh, NC (US); Matthew Abraham Richardson, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 727 days.

(21) Appl. No.: 11/118,744

(22) Filed: Apr. 29, 2005

(65) Prior Publication Data

US 2006/0245445 A1   Nov. 2, 2006

(51) Int. Cl.
*H04L 12/56* (2006.01)
*H04L 12/66* (2006.01)

(52) U.S. Cl. .................. 370/419; 370/463; 361/688

(58) Field of Classification Search .......... 370/419, 370/252, 386, 463; 379/338; 361/118, 117, 361/119, 688
See application file for complete search history.

(56) References Cited

U.S. PATENT DOCUMENTS

| 4,878,146 | A  | * | 10/1989 | Kaczmarek ............. 361/119 |
| 5,754,643 | A  | * | 5/1998  | Decker et al. .......... 379/413.02 |
| 5,880,919 | A  | * | 3/1999  | Napiorkowski et al. ..... 361/117 |
| 6,392,704 | B1 | * | 5/2002  | Garcia-Ortiz ............ 348/373 |
| 6,490,157 | B2 | * | 12/2002 | Unrein .................. 361/687 |

* cited by examiner

*Primary Examiner*—John Pezzlo
(74) *Attorney, Agent, or Firm*—Fogg & Powers LLC

(57) ABSTRACT

A network interface device is provided. The network interface device comprises an enclosure having a first portion coupled to a second portion wherein the first portion and second portion have cavities. The network interface device further comprises a removable case having a plate and a base wherein the plate is adapted to be coupled to the base, wherein the case is adapted to be removably disposed in the cavity of the second portion of the enclosure. A network interface circuit is disposed in the case, the network interface circuit is adapted to provide communication to and from a network and to and from at least one customer premise equipment.

17 Claims, 16 Drawing Sheets

A-A

NETWORK INTERFACE DEVICE HAVING IMPROVED THERMAL PROPERTIES

BACKGROUND

Network interface devices (NIDs) enable connection between an outside network and subscriber owned equipment. NIDs are typically mounted outdoors in unsheltered locations where access by service personnel is readily available. These NIDs are generally contained within enclosures which protect the internal electronics composing the NIDs from environmental conditions. The enclosures typically allow for easy access to the NIDs for testing and maintenance purposes.

Because network interface devices are often located outdoors, they are exposed to a wide range of weather conditions including heat, moisture, cold, and wind. Heat is a special concern in the design of network interface devices. The circuitry contained in the NID becomes less reliable at higher temperatures. Even though prior systems have tried to address the problem of overheating, internal temperatures in NIDs that fall outside of acceptable ranges are not uncommon.

For the reasons stated above and for other reasons stated below which will become apparent to those skilled in the art upon reading and understanding the present specification, there is a need in the art for a network interface enclosure that provides reliable and efficient protection for the internal circuitry from overheating while also allowing flexibility in design.

SUMMARY

The above-mentioned problems and other problems are resolved by the present invention and will be understood by reading and studying the following specification.

In one embodiment, a network interface device is provided. The network interface device comprises an enclosure having a first portion coupled to a second portion wherein the first portion and second portion have cavities. The network interface device further comprises a removable case having a plate and a base wherein the plate is adapted to be coupled to the base, wherein the case is adapted to be removably disposed in the cavity of the second portion of the enclosure. A network interface circuit is disposed in the case, the network interface circuit is adapted to provide communication to and from a network and to and from at least one customer premise equipment.

In one embodiment, a network interface device with improved thermal properties is provided. The network interface device comprises an enclosure having a first portion coupled to a second portion wherein the first portion and section portion have cavities. A plate separates the cavities of the first portion and the second portion. Network interface circuitry is disposed in the cavity of the second portion of the enclosure and the cavity of the first portion and the plate provide thermal insulation to the network interface circuitry.

In one embodiment, a network interface device configurable to provide wireless access to user terminals via one of an internal and an external antenna is provided. The network interface device comprises an enclosure having a first portion coupled to a second portion wherein the first portion and section portion have cavities. Wireless interface circuitry and wired interface circuitry is disposed in the cavity in the second portion of the enclosure. A plate with protuberances separates the cavities of the first portion and the second portion of the enclosure. Electrical leads that are coupled to the wireless interface circuitry engage the protuberances of the plate. At least one slot located in the cavity of the second portion of the enclosure is adapted to receive at least one internal antenna component; and at least one jack coupled to one of the protuberances of the plate is adapted to couple to one of an internal antenna and an external antenna.

In one embodiment, a network interface device is provided. The network interface device comprises an enclosure having a first portion coupled to a second portion wherein the first portion and section portion have cavities. The network interface device further comprises a removable case having a plate and a base where the plate is adapted to be coupled to the base. The case is adapted to be removably disposed in the cavity of the second portion of the enclosure. A network interface circuit is adapted to be received by the case, where the case containing the network interface circuit is able to be taken out without removing wiring or adding wiring. The case is adapted to be placed in another network interface device without removing wiring or adding wiring.

BRIEF DESCRIPTION OF THE DRAWINGS

The present invention can be more easily understood and further advantages and uses thereof more readily apparent, when considered in view of the description of the embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the embodiments, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide improvements in the design and operation of network interface devices. In one embodiment, the network interface device has improved thermal properties. The improvements are created by isolating the network interface circuitry from an external heat source by at least two distinct thermal barriers. The first barrier is a cavity located in a first portion of an enclosure. The network interface circuitry is disposed in a cavity of the second portion. The second barrier is a plate located between the cavity of the first portion and network interface circuitry disposed in the second portion of the enclosure.

In another embodiment, the network interface device provides wireless connection to customer premise equipment. In this embodiment, the network interface device is configurable to either use external or internal antennas using a common housing.

In another embodiment, the network interface device provides improved access to the circuitry of the network interface device to service personnel. This access is provided through a network interface port providing both network access and craft port access. In embodiments of the present invention, the network interface port is secured. In one embodiment, the network interface device has a secured panel on the first portion of the enclosure that provides access to the network interface port when it is opened. In another embodiment, the network interface device has a secured panel on the second portion of the enclosure that covers the network interface port.

In another embodiment, the network interface device provides easy access to the circuitry and easy configuration for service personnel. In this embodiment, the network interface device includes a case that contains the network interface circuitry and is removable to be placed into another network interface device without removing physical wires.

Figure 1:
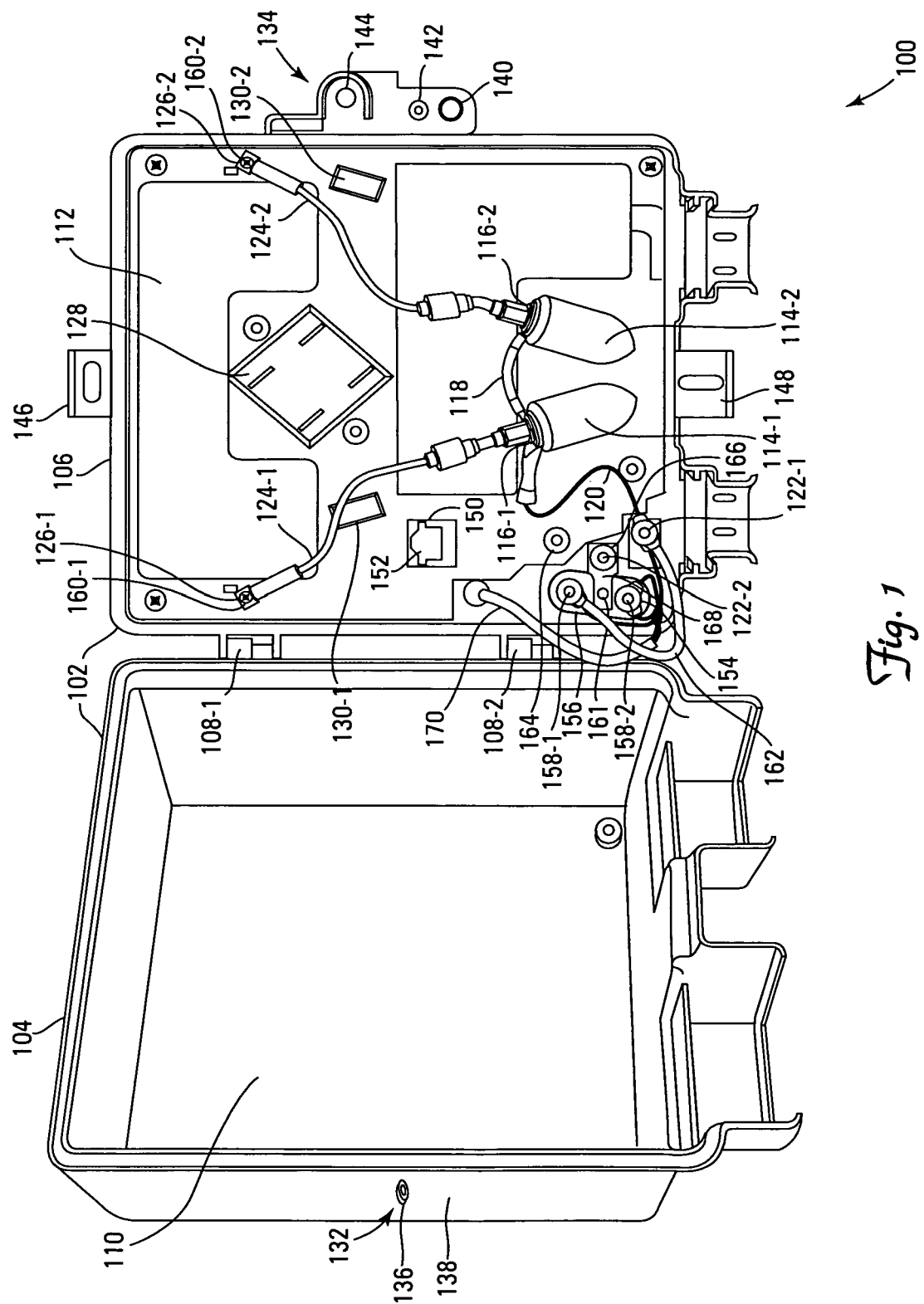
FIG. 1 is a view of a network interface device of one embodiment of the present invention.

FIG. 1 is a view of a network interface device shown generally at 100. Network interface device 100 incorporates two air barriers to protect circuitry from overheating. The two air barriers are built into the construction of an enclosure 102. Enclosure 102 is composed of a first portion 104 and a second portion 106. First portion 104 is adapted to fit over second portion 106 so that when combined enclosure 102 is substantially sealed. In one embodiment, first portion 104 and second portion 106 are connected by hinges 108-1 and 108-2. A single hinge, bolts, screws, and snap fit designs are contemplated.

First portion 104 forms a cavity and has a wall portion 110 so that when first portion 104 and second portion 106 are connected to substantially seal enclosure 102, there is a gap that separates wall portion 110 from second portion 106. In one embodiment, this gap is substantially filled with air that provides a first thermal barrier or layer of thermal insulation. In one embodiment, the depth of the first portion 104 is three inches or less. In another embodiment, the depth of the first portion is greater than three inches. Depths of the first portion 104 vary in order to meet size requirements for a particular application.

Figure 4:
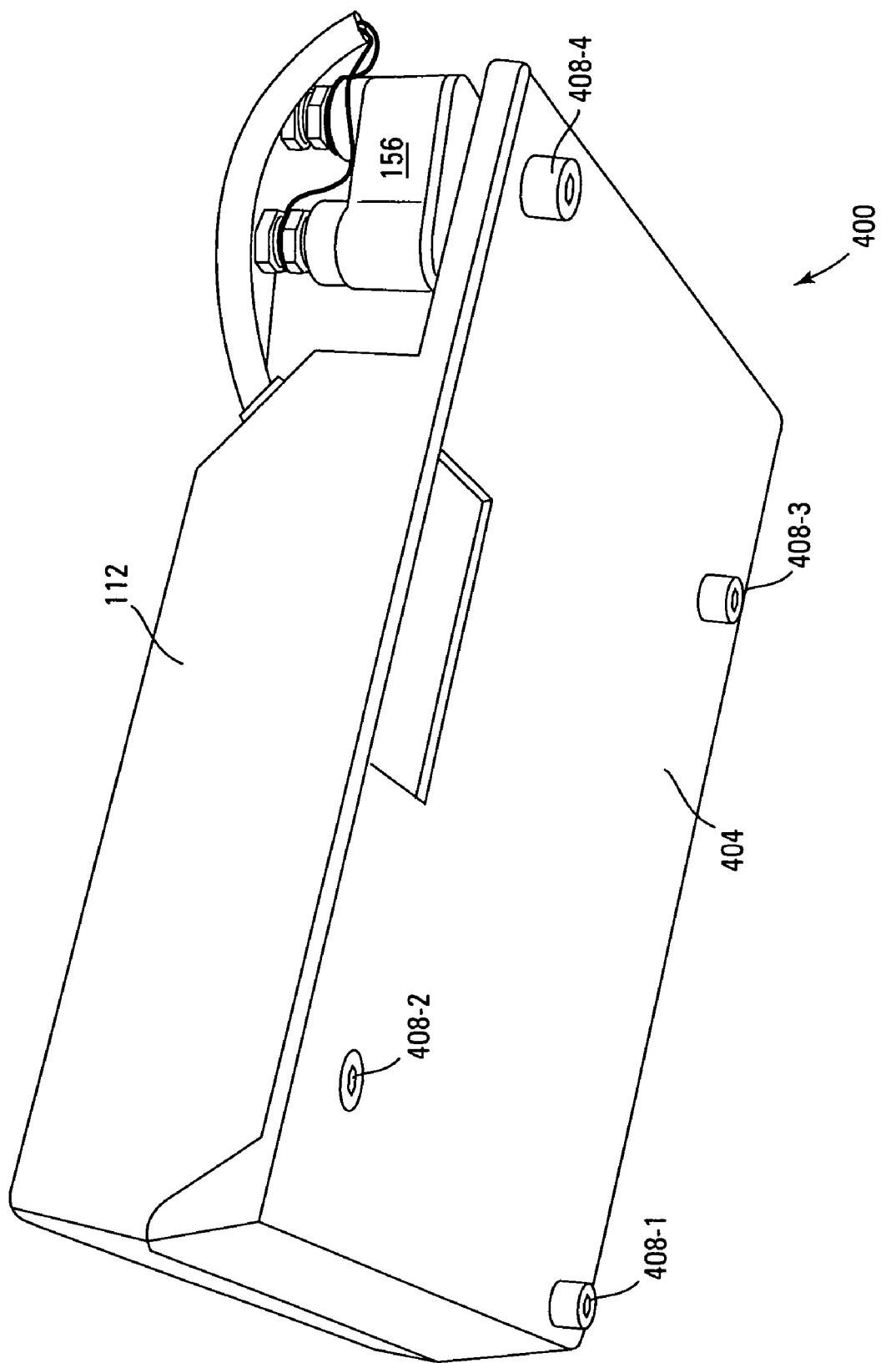
FIG. 4 is a view of a removable case of one embodiment of the present invention.

Second portion 106 also forms a cavity which is adapted to receive a plate 112. In one embodiment, plate 112 is secured to second portion 106 by one of the following: screws, bolts, epoxy, and other known methods by those skilled in the art. In one embodiment, plate 112 is secured to a base 404 as shown in FIG. 4. Plate 112 provides the second thermal barrier.

Figure 3:
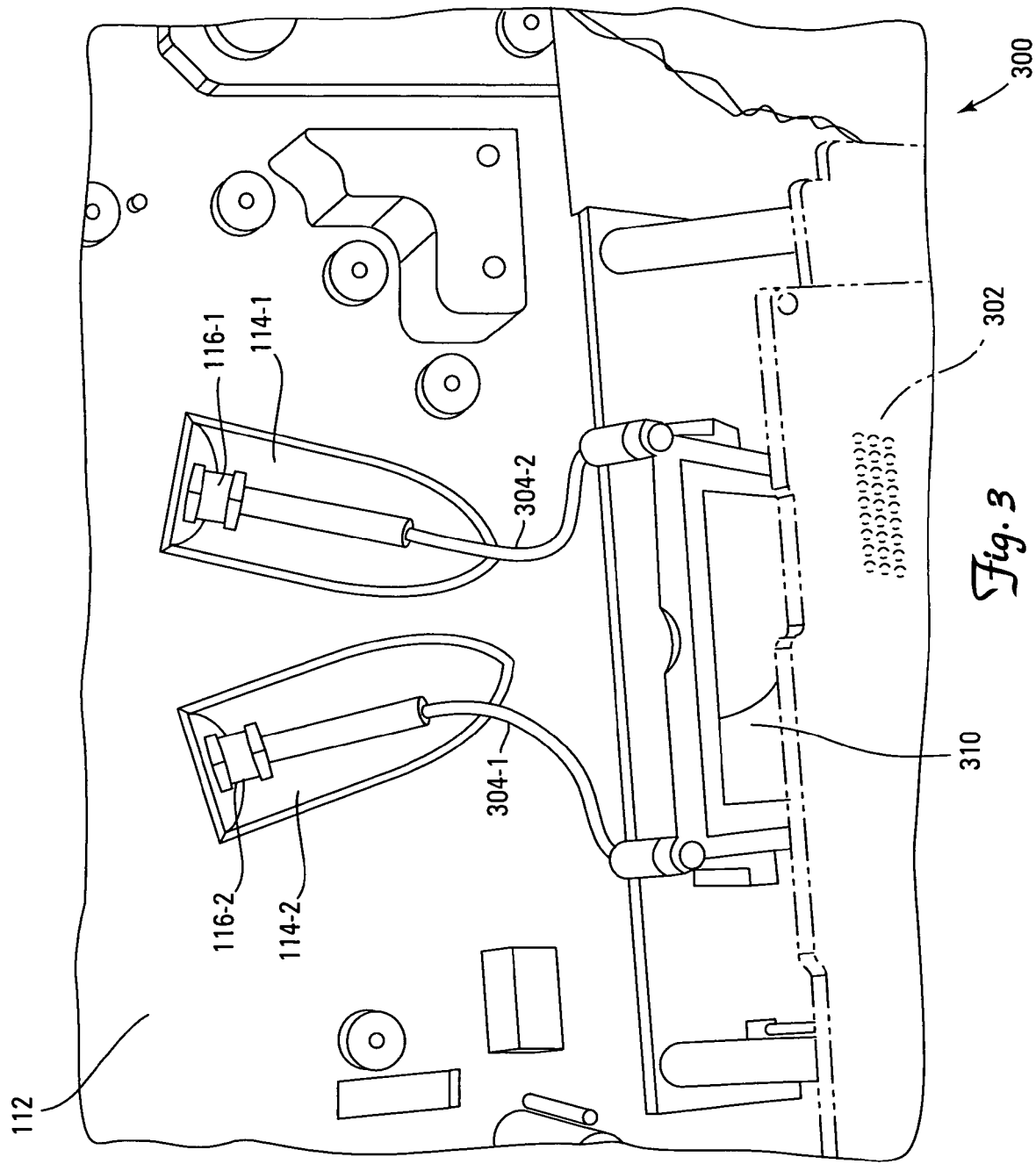
FIG. 3 is a view of a network interface device of one embodiment of the present invention.

In one embodiment, plate 112 has angled protuberances 114-1 and 114-2. Angled protuberances 114-1 and 114-2 are adapted to receive electrical leads from network interface circuitry as shown in FIG. 3. The network interface circuitry is adapted to provide communication to and from a network and to and from customer premise equipment as shown and further described with respect to FIG. 6.

The electrical leads are coupled to the jacks 116-1 and 116-2 that are adjacent to the ends of the protuberances 114. In one embodiment, jacks 116-1 and 116-2 are sub miniature version A (SMA) connectors. The jacks 116-1 and 116-2 are connected together via a common ground wire 118. Common ground wire 118 is coupled to a ground wire 120. Ground wire 120 is coupled to a ground post 122-1.

Ground post 122-1 provides a reference voltage level (called zero potential or ground potential) against which all other voltages in a system are established and measured. An effective electrical ground connection also minimizes the susceptibility of equipment interference and reduces the risk of equipment damage due to electrostatic buildup. In effect, an electrical ground drains away any unwanted buildup of electrical charge.

Network interface device 100 provides wireless access to the network for customer premise equipment. In one embodiment, network interface device 100 is configurable to provide this access with either internal or external antennas. Jacks 116-1 and 116-2 are adapted to couple to connectors 124-1 and 124-2. Connectors 124-1 and 124-2 are adapted to connect to internal antennas as described with respect to FIG. 5 below. In another embodiment, jacks 116-1 and 116-2 are adapted to couple to a connector 216 that connects to external antennas as described with respect to FIG. 2 below. The internal antennas or external antennas allow the network interface circuitry to communicate with a network as well as with customer premise equipment.

In one embodiment, connectors 124-1 and 124-2 are coupled to internal antennas via openings 126-1 and 126-2 in plate 112. In one embodiment, connectors 124-1 and 124-2 are coupled to the internal antennas using MCX connectors 160-1 and 160-2 respectively. In this embodiment, there are two internal antennas, one primary antenna and one diversity antenna. However, a single antenna as well as more than two antennas is contemplated.

In one embodiment, plate 112 has a recess 128. Recess 128 is used for embodiments including an external antenna and is further described below with respect to FIG. 2. In another embodiment, protrusions 130-1 and 130-2 are utilized for connectors 124-1 and 124-2 to couple to the internal antennas. The use of protrusions 130-1 and 130-2 allow another path for external antennas to connect to the network interface circuitry.

In one embodiment, enclosure 102 has a security mechanism that is made of a first security mechanism 132 disposed on first portion 104 and a second security mechanism 134 disposed on second portion 106. Second security mechanism 134 is adapted to receive first security mechanism 132 when enclosure 102 is in the closed position. First security mechanism 132 has a peg 136 and a hole 138. Second security mechanism 134 has a first hole 140, a second hole 142 and a third hole 144. When first security mechanism 132 is mated to second security mechanism 134 in the closed position, peg 136 is received by second hole 142 and hole 138 substantially lines up with first hole 140.

In one embodiment, enclosure 102 is secured by feeding a padlock through hole 138 and first hole 140 and locking the padlock. In another embodiment, an F81 lock is used that is adapted to be received by third hole 144 of second security mechanism 134. Other locking techniques and mechanisms are contemplated.

Second portion 106 has a first mounting fixture 146 and a second mounting fixture 148. First mounting fixture 146 and second mounting fixture 148 are attached to a surface by one of the following: screws, bolts, nails, and other known methods by those skilled in the art.

Plate 112 has an opening 150 that is adapted to receive a network interface port 152. In one embodiment, network interface port 152 is an RJ 45 craft/service port. The RJ 45 provides a user craft port access and network access. In another embodiment, network interface port 152 is an RS 232 port which provides a user only craft port access.

Figure 5:
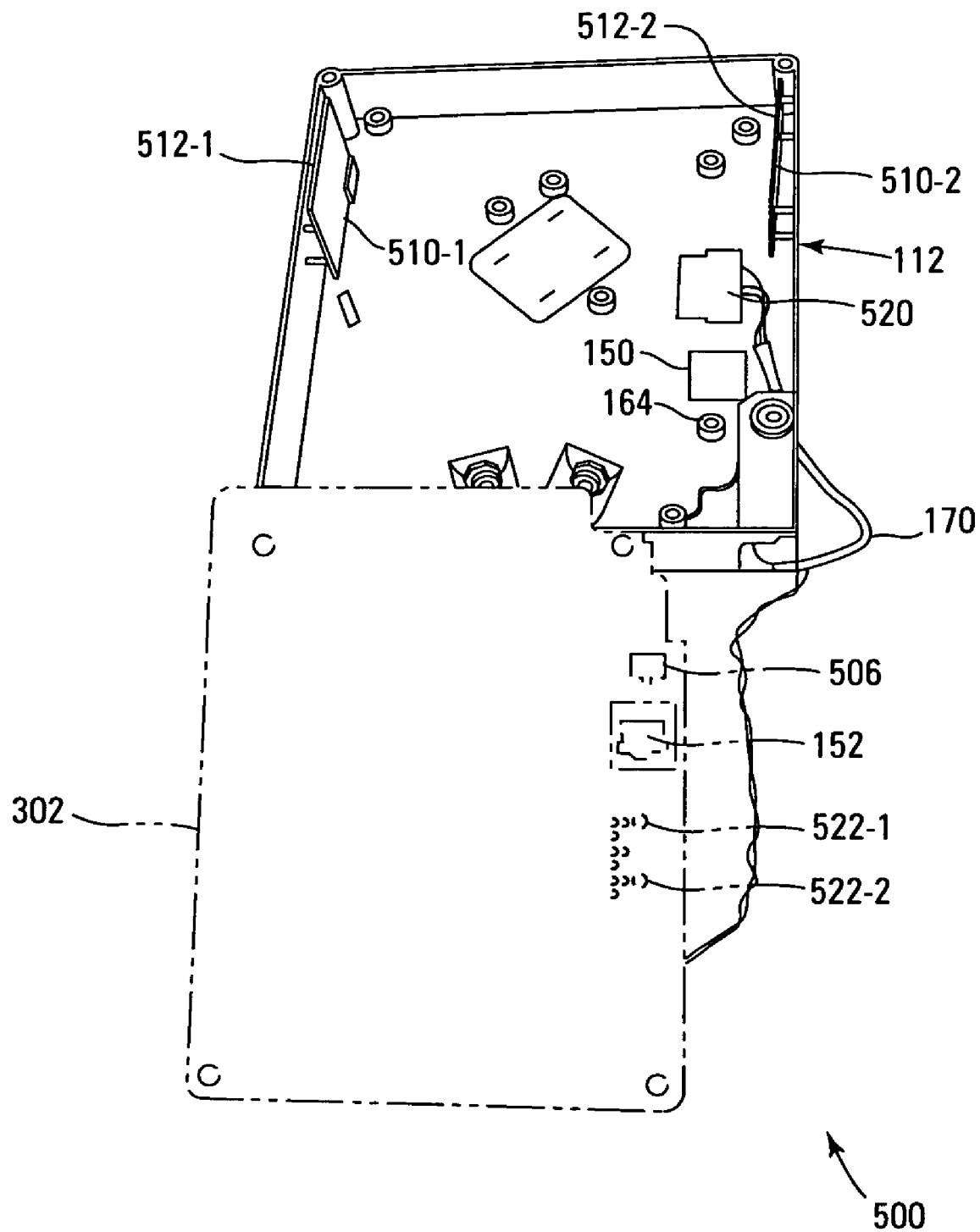
FIG. 5 is a view of a network interface device of one embodiment of the present invention.

Plate 112 also comprises an opening 164 to provide a user access to a reset button in order to reset the network interface circuit (shown in FIG. 5). In one embodiment, access to both the reset button and the network interface port 152 is restricted by the security mechanism described above. In another embodiment, access to both the reset button and the network interface port 152 is restricted as described with respect to FIG. 7 or FIG. 8 below.

By pressing the reset button for a short period of time the network interface circuitry is reset. Holding the reset period of an extended period of time causes the network interface circuitry to do a complete restart. The reset button is further described with respect to FIG. 5 below.

Coupled to the network interface circuitry and plate 112 and disposed in the second portion 106 of enclosure 102 is a surge protector 156. Surge protector 156 protects the network interface circuitry from power surges. A power surge, or transient voltage, is an increase in voltage significantly above the designated level in a flow of electricity. Power surges are caused by a number of factors such as lightning, high-power electrical devices, faulty wiring, downed power lines, problems with utility company's equipment and other factors known by those skilled in the art.

In the embodiment shown in FIG. 1, surge protector 156 has two posts 158-1, 158-2 and a ground bar 161. In alternate embodiments, surge protector 156 has only one post, or more than two posts in order to provide protection to the network interface circuitry. A ground bracket 123 which has ground posts 122-1, 122-2 is disposed in second portion 106 of enclosure 102. Ground bar 161 is coupled to ground post 122-2 of ground bracket 123 to provide a common ground and is secured by a nut 166. This provides a point that is considered to have zero voltage. All other circuit voltages are measured or defined with respect to it.

In the embodiment shown in FIG. 1, post 158-1 of surge protector 156 is coupled to a ring connector 162 that is coupled to ground post 122-1. When a power surge occurs, surge protector 156 diverts the extra electricity into ground bracket 123 thus protecting the network interface circuitry. In one embodiment, post 158-2 is coupled to a tip connector 154 and ground post 122-2 is coupled to a ground connector 168. Tip connector 154, ring connector 162, and ground connector 168 are received by wire case 170 that is adapted to connect to the network interface circuitry as shown in FIG. 5. Surge protector 156 is removable from second portion 106 of enclosure 102.

In operation, surge protector 156 is removed by loosening the nut 166 on ground post 122-2, and taking off the tip and ring connectors 154, 162 on posts 158-2, 158-1 respectively. Ground connector 168 is removed from ground post 122-2, and ground bar 161 slips over the top of ground post 122-2. Surge protector 156 is removed without having to disconnect the network interface circuit from ground post 122-1 of ground bracket 123 which provides a common ground.

Figure 2:
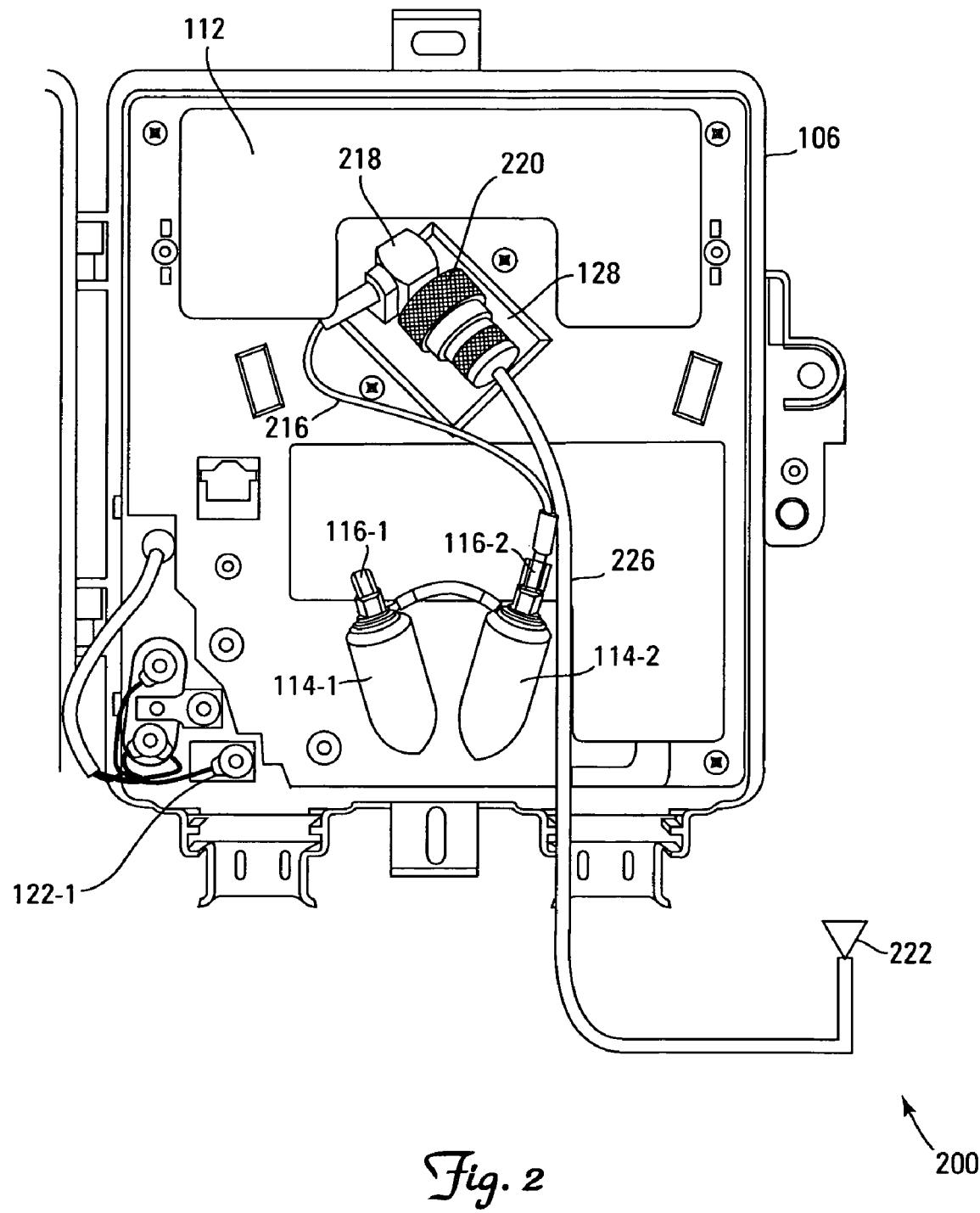
FIG. 2 is a view of a network interface device of one embodiment of the present invention.

FIG. 2 is a view of a network interface device shown generally at 200. Network interface device 200 has a plate 112 disposed in a second portion 106 of enclosure 102. Plate 112 has angled protuberances 114-1 and 114-2 that are adapted to receive electrical leads from network interface circuitry as shown below in FIG. 3. The electrical leads are coupled to the jacks 116-1 and 116-2 that are adjacent to the ends of the protuberances 114-1 and 114-2. In one embodiment, jacks 116-1, 116-2 are SMA connectors.

The jacks 116-1, 116-2 are coupled together via a common ground wire 118. Common ground wire 118 is connected to a ground wire 212. In one embodiment, ground wire 212 is as shown with respect to ground wire 120 of FIG. 1. In this embodiment, ground wire 212 is covered in ferrite. Advantages ferrite has over other electro magnetic materials include its inherent high resistivity which results in low eddy current losses over wide frequency ranges, high permeability and stability over wide temperature ranges.

Ground wire 212 is coupled to ground post 122-1 of ground bracket 123 in FIG. 1. Ground post 122-1 provides a common ground which is a point that is considered to have zero voltage. All other circuit voltages are measured or defined with respect to it.

Jacks 116-1 and 116-2 are adapted to couple to connectors 216. In this embodiment, connector 216 is a single connector supporting only one external antenna 222, however multiple connectors for multiple external antennas 222 are contemplated. Connector 216 is adapted to couple to a first external antenna connector 218. In one embodiment, first external antenna connector 218 is a female N-type connector. First external antenna connector 218 is adapted to couple to a second external antenna connector 220. In one embodiment, second external antenna 220 is a male N-type connector.

In one embodiment, second external antenna connector 220 is coupled to an external antenna wire 226. External antenna wire is coupled to external antenna 222. Multiple external antenna wires 226 for multiple external antennas 222 are contemplated.

In one embodiment, plate 112 has a recess 128 that is adapted to receive the first external antenna connector 218 and the second external antenna 220. By placing the first external antenna connector 218 and the second external antenna 220 in recess 128, the depth of the first portion 104 of FIG. 1 is able to be reduced and still be able to mate with second portion 106. The depth of recess 128 varies to accommodate changes that are made in the depth of the first portion 104 of FIG. 1 to meet size requirements for a particular application.

Figure 6:
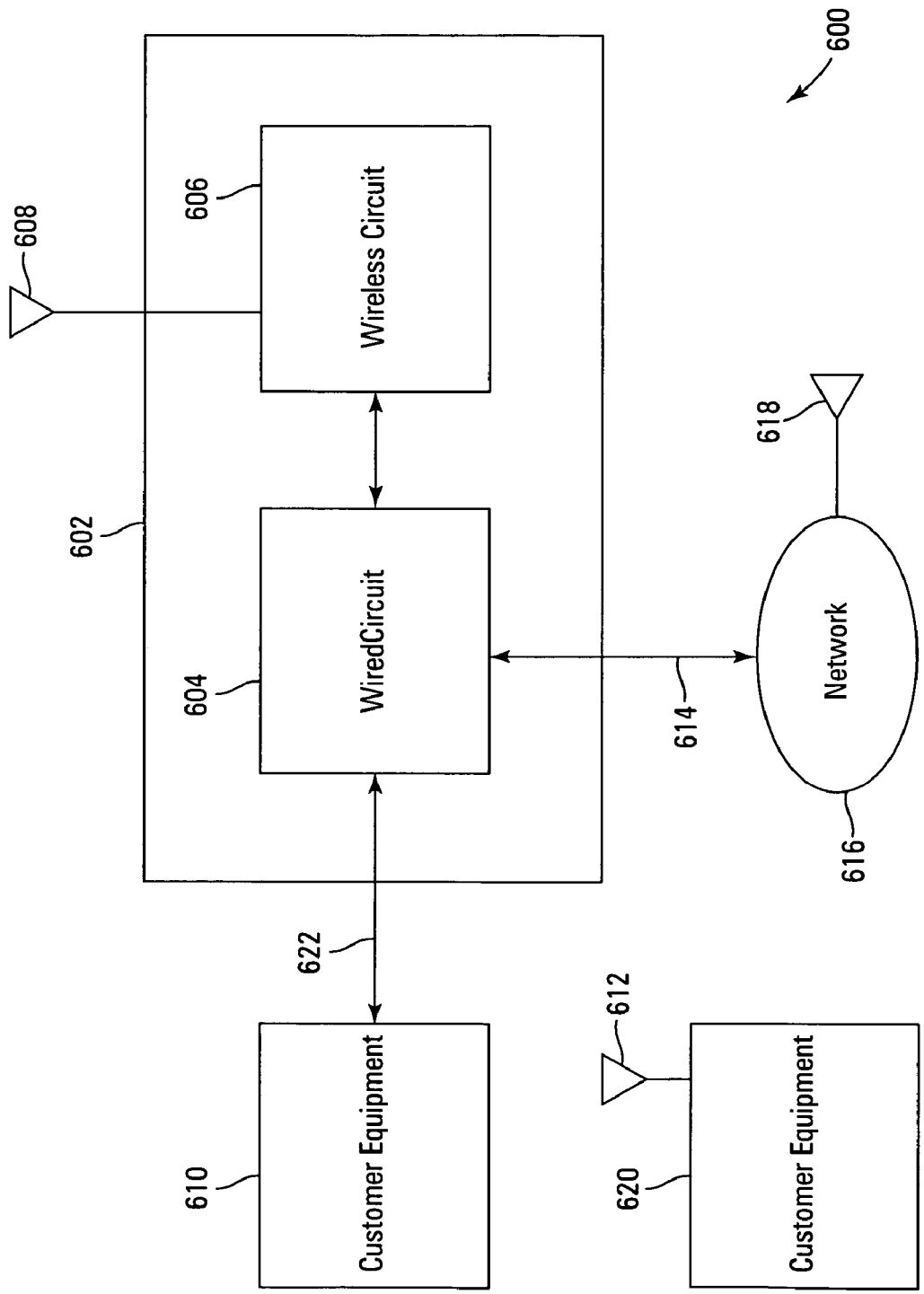
FIG. 6 is a block diagram of one embodiment of a network interface device of the present invention.

FIG. 3 is one embodiment of a network interface circuit for use in network interface device 100 shown generally at 300. In this embodiment, a network interface circuit 302 is coupled to electrical leads 304-1 and 304-2. Network interface circuit 302 has a wireless interface circuit 310 for customer premise equipment. In one embodiment, network interface circuit 302 is as shown with respect to network interface circuit 602 of FIG. 6 and includes both a wireless interface circuit 606 and a wired interface circuit 604 as shown in FIG. 6. The network interface circuit 302 is adapted to provide communication to and from a network. Electrical leads 304-1 and 304-2 are coupled to the wireless interface circuit 310 and are coupled to jacks 116-1 and 116-2 located in angled protuberances 114-1 and 114-2 formed in a plate 112.

In one embodiment, jacks 116-1 and 116-2 are SMA connectors. On the opposite side of plate 112, the jacks 116-1 and 116-2 are connected via common ground wire 118 as shown in FIG. 1. Jack 116-1 is coupled to ground wire 120 which is coupled to a ground post 122-1.

Ground post 122-1 provides a reference voltage level (called zero potential or ground potential) against which all other voltages in a system are established and measured. An effective electrical ground connection also minimizes the susceptibility of equipment interference and reduces the risk of equipment damage due to electrostatic buildup. In effect, an electrical ground drains away any unwanted buildup of electrical charge.

In one embodiment, jacks 116-1 and 116-2 are adapted to receive connectors 124-1 and 124-2 that connect to internal antennas as described above with respect to FIG. 1. In another embodiment, jacks 116-1 and 116-2 are adapted to receive connector 216 that connects to an external antenna as described above with respect to FIG. 2.

FIG. 4 is a view of a removable case shown generally at 400. Case 400 is comprised of a plate 112 and a base 404. Plate 112 and base 404 are coupled together by one of the following means: screws, bolts, snap fit designs and other known methods by those skilled in the art. Case 400 is adapted to be removably disposed in the cavity of the second portion 106 of the enclosure 102. The network interface circuitry 302 described in FIG. 3 is disposed in case 400. Case 400 is removably attached to second portion 106 by one of the following means: screws, bolts and other known methods by those skilled in the art. Because all the network interface circuitry 302 is contained by case 400 there is no need for the elimination of electrical connections, removal of wires, or the disconnection of multiple components in order to remove the case 400.

In operation, case 400 is removed by unscrewing four screws (not shown) located in holes 408-1 through 408-4. The screws are received by the second portion 106 of the enclosure 102 and hold the case 400 in place. Case 400, if desired, is placed in another network interface device 100 having a second portion 106 similar to that of FIG. 1. Case 400 is held in place by re-inserting the screws into the holes 408 which are received by second portion 106.

A surge protector 156 is coupled to the network interface circuitry 302 and abuts the case 400. Because surge protector 156 is external to the case 400, it is easily removable for replacement without having to open up the case 400. Surge protector 156 is removed as described with respect to FIG. 1.

FIG. 5 is a view of a network interface device shown generally at 500. Network interface device 500 is comprised of a network interface circuit 302 and a plate 112. In one embodiment, network interface circuit 302 has a wireless interface circuit 310 for customer premise equipment as shown in FIG. 3. In another embodiment, network interface circuit 302 is as shown with respect to network interface circuit 602 of FIG. 6 and includes both a wireless interface circuit 606 and a wired interface circuit 604 as shown in FIG. 6. The network interface circuit 302 is adapted to provide communication to and from a network.

Network interface circuit 302 has a network interface port 152. In one embodiment, network interface port 152 is an RJ 45 craft/service port. The RJ 45 provides a user craft port access and network access. In another embodiment, network interface port 152 is an RS 232 input which provides a user only craft port access. Other types of ports are contemplated and within the scope of the invention.

Network interface circuit 302 also includes a reset button 506. Reset button 506 when held (pushed in) for a short time resets the network interface circuit 302. In one embodiment, the short time is less than two seconds. When reset button 506 is held for a longer period of time the network interface circuit 302 is completed restarted. In one embodiment, the long period is greater than two seconds.

In one embodiment, access to both the reset button 506 and the network interface port 152 is restricted by the security mechanism described above with respect to FIG. 1. In another embodiment, access to both the reset button 506 and the network interface port 152 is restricted by the security mechanism described below with respect to FIG. 7 or FIG. 8.

Network interface port 152 is received by an opening 150 which allows access to a user as shown in FIG. 1. Reset button 506 is received by an opening 164 which allows access to a user.

A wire case 170 contains the tip connector 154, ring connector 162, and ground connector 168 as described with respect to FIG. 1. Tip connector 154, ring connector 162, and ground connector 168 are received by a circuit connector 520 which is adapted to couple to posts 522-1, 522-2 (only backside shown). This provides the network interface circuit 302 surge protection and a common ground.

Plate 112 has slots 510-1 and 510-2 that are adapted to receive internal antennas 512-1, 512-2. Internal antennas 512-1, 512-2 are coupled to the network interface circuit 302 as described with respect to FIG. 1 above.

FIG. 6 is a block diagram of one embodiment of a network interface device shown generally at 600. Network interface circuit 602 is comprised of a wired network circuit 604 and a wireless network circuit 606. In one embodiment, wired circuit network 604 and wireless network circuit 606 are two different circuits. In another embodiment, wired network circuit 604 and wireless network circuit 606 are the same circuit. In another embodiment, wired network circuit 604 and wireless network circuit 606 are located on the same chip. In another embodiment, wired network circuit 604 and wireless network circuit 606 share some common components.

In one embodiment, the wireless network circuit 606 supports one or more of the Institute for Electrical and Electronics Engineers (IEEE) 802.11 family of standards. In one embodiment, the wired network circuit 604 supports one or more of the IEEE 802.3 family of standards.

Wireless network circuit 606 is coupled to an antenna 608. In one embodiment, antenna 608 is an internal antenna as described in FIG. 5. In one embodiment, antenna 608 is coupled to wireless circuit 606 as described with respect to FIG. 1. In another embodiment, antenna 608 is an external antenna and is coupled to wireless circuit network 606 as described with respect to FIG. 2.

Antenna 608 communicates with an antenna 618 coupled to a network 616. Antenna 608 is also able to communicate with an antenna 612 coupled to customer equipment 620. Types of customer equipment are computers, telephones, fax machines, and other network terminals.

In one embodiment, network interface circuit 602 is connected to network 616 via a connection line 614 that is coupled to wired network circuit 604. Connection line 614 may include one or more transmission media such as fiber optic, coaxial, twisted pair or simple copper wire, or other medium of information transmission, and interface devices for such media or combinations thereof. Connection line 614 provides two-way communication between wired network circuit 604 and network 616.

In one embodiment, wired network circuit 604 is connected to customer equipment 610 via a connection line 622. Connection line 622 may include one or more transmission media such as fiber optic, coaxial, twisted pair or simple copper wire, or other medium of information transmission, and interface devices for such media or combinations thereof. Connection line 622 provides two-way communication between wired network circuit 604 and customer equipment 610.

In one embodiment, network interface circuit 602 is contained in case 400 of FIG. 4. In one embodiment, case 400 is located in enclosure 102 of FIG. 1. In other embodiments, case 400 is mounted on walls, ceilings, inside plenums or in other locations within a building.

Figure 7:
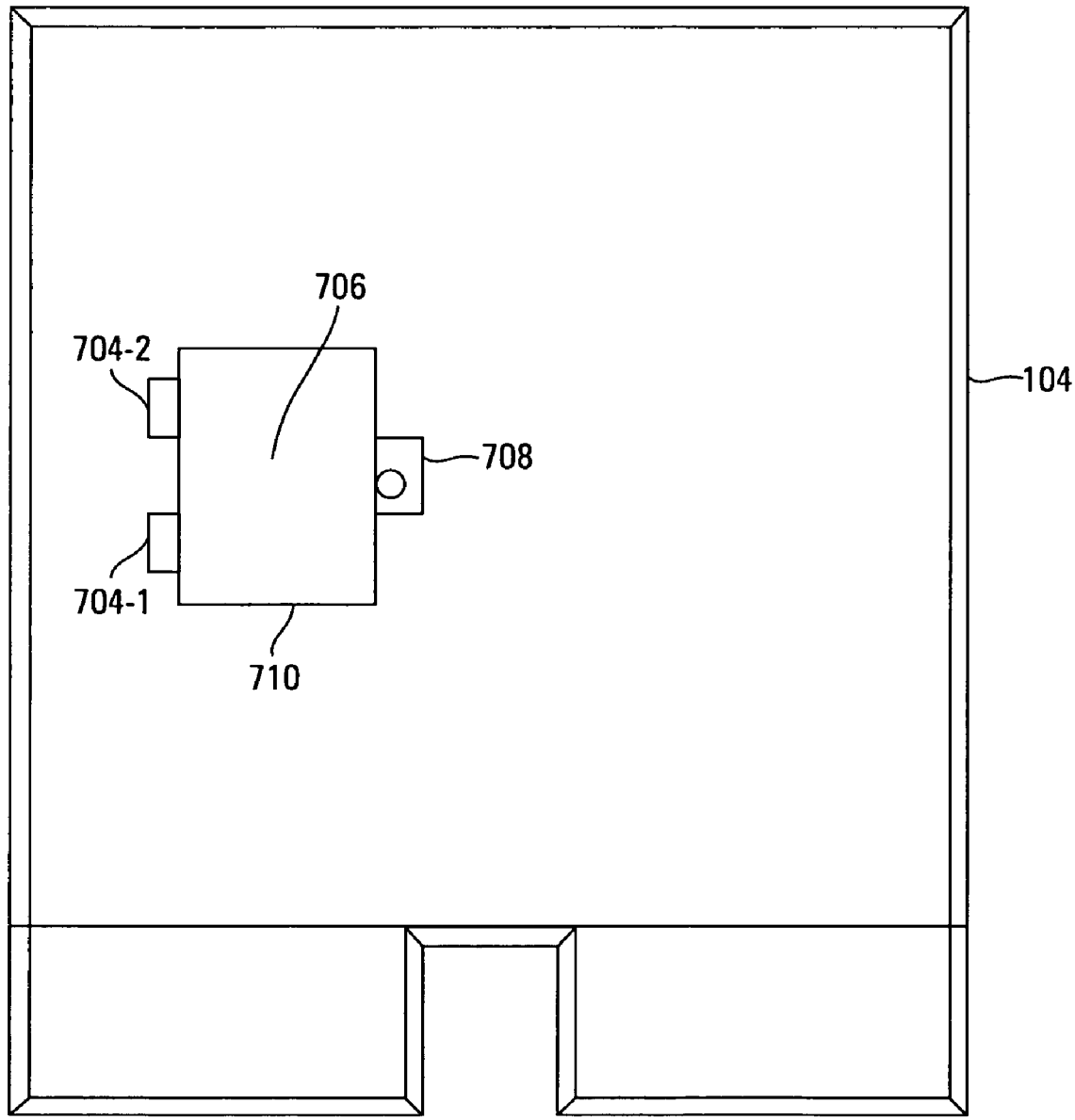
FIG. 7 is a view of a network interface device of one embodiment of the present invention.

FIG. 7 is a view of a network interface device shown generally at 700. Network interface device 700 has an enclosure with a first portion 104 and a second portion as described with respect to FIG. 1 above. First portion 104 contains an optional opening (not visible) that provides access to a reset button and a network interface port. The reset button (not visible) and network interface port (not visible) are as described above with respect to reset button 506 and network interface port 152 of FIG. 5.

In this embodiment, the opening of first portion 104 is covered by an optional security mechanism 710 having a panel 706. Panel 706 is coupled to first portion 104 by one of the following: hinges, snap fit designs, screws, bolts, epoxy, and other known methods by those skilled in the art. In this embodiment, hinges 704-1 and 704-2 allow panel 706 to open and close. When the panel 706 is in the open position the reset button and network interface port are accessible by a user.

Panel 706 is coupled to a locking mechanism 708. Types of locking mechanisms 708 are described above with respect to FIG. 1. When panel 706 is in the closed position, the reset button and the network interface port are restricted by the locking mechanism 708.

Figure 8:
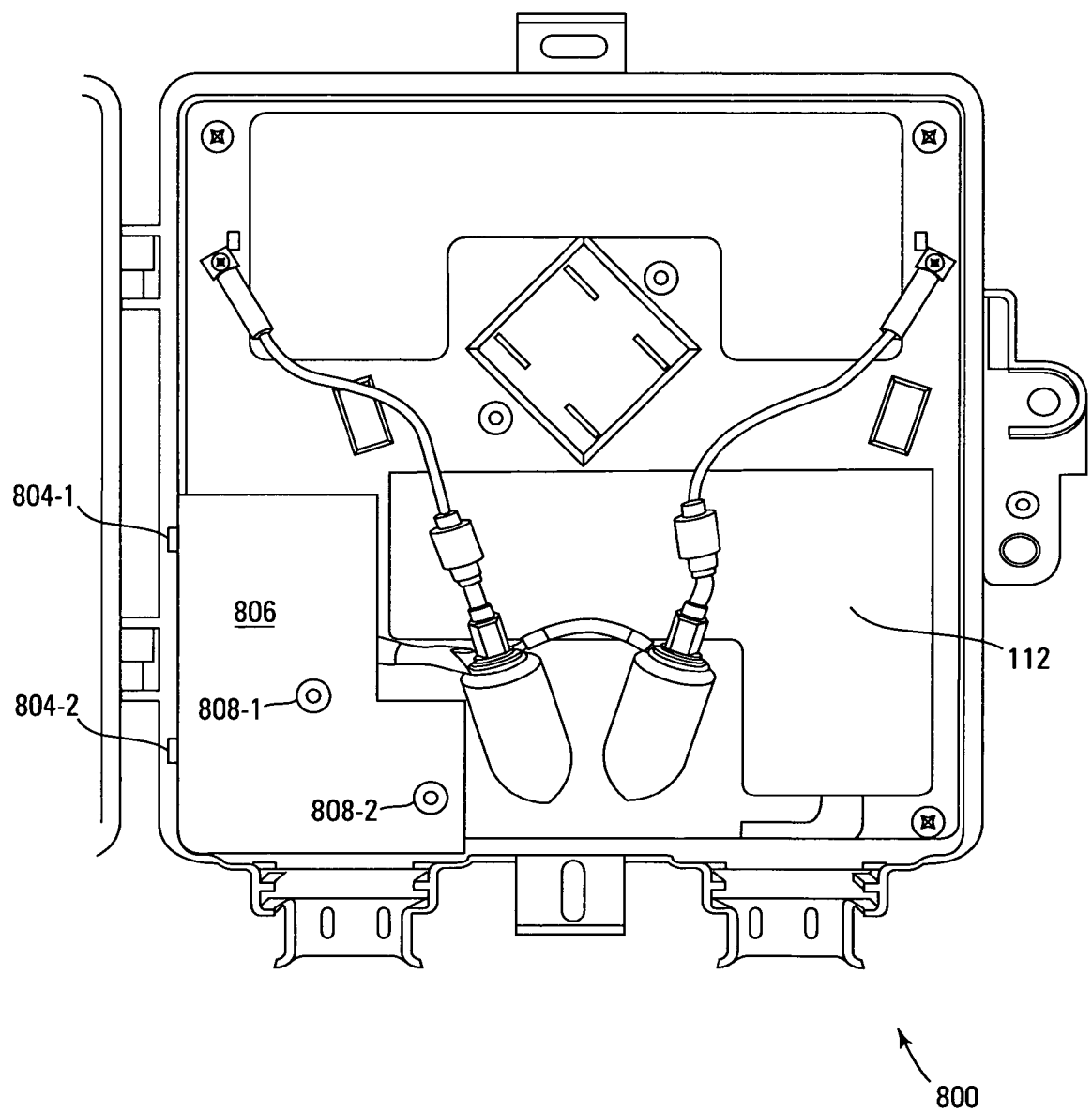
FIG. 8 is a view of a network interface device of one embodiment of the present invention.

FIG. 8 is a view of a network interface device shown generally at 800. Network interface device 800 has a plate 112 with an optional panel 806 that provides access to a reset button (not visible), a network interface port (not visible), and a surge protector (not visible). In one embodiment, the reset button (not visible) and network interface port (not visible) are as described above with respect to reset button 506 and network interface port 152 of FIG. 5. In one embodiment, the surge protector (not visible) is described above with respect to surge protector 156 of FIG. 1.

Panel 806 is coupled to plate 112 by one of the following: hinges, snap fit designs, screws, bolts, epoxy, and other known methods by those skilled in the art. In this embodiment, hinges 804-1 and 804-2 allow panel 806 to open and close. Panel 806 is secured to plate 112 by screws (not shown) inserted into holes 808-1 and 808-2. When panel 806 is in the closed position, access to the reset button, the network interface port, and the surge protector is restricted.

Figure 9:
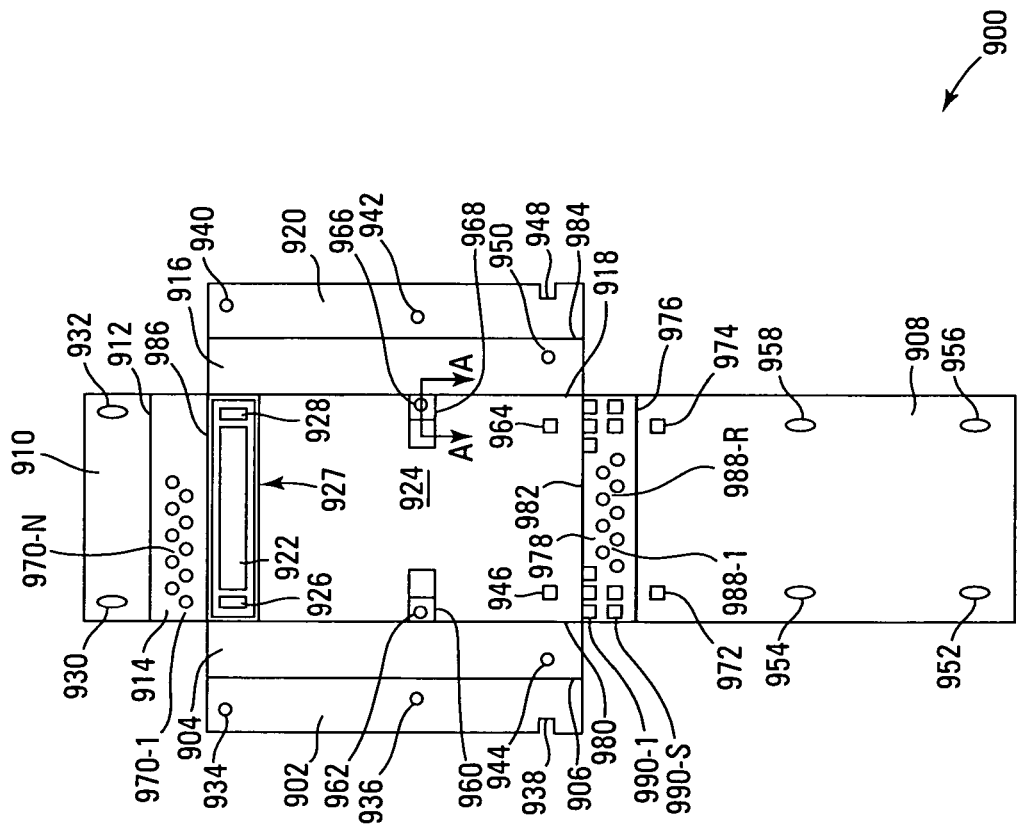
FIG. 9 is a view of a shield of one embodiment of the present invention.

FIG. 9 is a view of one embodiment of a shield shown generally at 900. In one embodiment, shield 900 is adapted to reduce radio frequency (RF) emissions produced by components inside a network interface device. The embodiment shown in FIG. 9 is described here as being implemented using the network interface device 100 of FIG. 1 (though other embodiments are implemented in other ways, for example, using other telecommunication devices). In the embodiment shown in FIG. 9, shield 900 is adapted to reduce RF emissions produced by wireless interface circuit 310 of FIG. 3. Shield 900, in one embodiment, is formed out of a sheet of material comprising a conductive side and a non-conductive side. In one embodiment, the conductive side of the material comprises an aluminum layer and the non-conductive side comprises a layer of black Formex GK-10 material. In one implementation of such an embodiment, the aluminum layer is 0.002 inches thick and the layer of black Formex GK-10 is 0.10 inches thick.

The shield 900 comprises a first portion 924. The first portion 924 comprises a first ground tab 960 with a hole 962 and a second ground tab 968 with a hole 966. First ground tab 960 and second ground tab 968 are further described with respect to FIG. 12 below. First portion 924 also comprises a hole 946 and a hole 964. Hole 946 and hole 964 enable a user to see inside shield 900 after it has encapsulated wireless interface circuit 310 of FIG. 3. In one embodiment, hole 946 and hole 964 also enable heat to dissipate from within shield 900.

First portion 924 also comprises a region 927. Region 927 comprises a hole 922 a hole 926 and a hole 928. Hole 922 is adapted to (that is, is sized and located to) receive a connector and a board header as shown and described in further detail with respect to FIGS. 11 and 12. Holes 926 and 928 are adapted to receive screws and are further described with respect to FIG. 11.

First portion 924 is adjacent to a second portion 904 of the shield 900. Second portion 904 has a hole 944. Hole 944 is adapted to receive a cable. In one embodiment, the cable is electrical lead 304-2. Second portion 904 and first portion 924 are foldable with respect to each other along a line 980. Second portion 904 is adjacent to a third portion 902 of the shield 900.

Third portion 902 and second portion 904 are foldable with respect to each other along a line 906. In one embodiment, third portion 902 has a hole 934 and a hole 936. Holes 934 and 936 are adapted to receive screws, bolts and other securing devices known by those skilled in the art and are further described below with respect to FIG. 16. In one embodiment, third portion 902 also has a notch 938.

First portion 924 is adjacent to a fourth portion 916 of the shield 900. Fourth portion 916 has a hole 950. Hole 950 is adapted to receive a cable. In one embodiment, the cable is electrical lead 304-1. Fourth portion 916 and first portion 924 are foldable with respect to each other along a line 918. Fourth portion 916 is adjacent to a fifth portion 920 of the shield 900.

Fifth portion 920 and fourth portion 916 are foldable with respect to each other along a line 984. In one embodiment, fifth portion 920 has a hole 940 and a hole 942. Holes 940 and 942 are adapted to receive screws, bolts and other securing devices known by those skilled in the art and are further described below with respect to FIG. 16. In one embodiment, fifth portion 920 also has a notch 948.

First portion 924 is also adjacent to a sixth portion 914 of the shield 900. Sixth portion 914 has holes 970-1 through 970-N. Holes 970-1 through 970-N are designed to block particular frequencies from being emitted from shield 900. In one embodiment, holes 970-1 through 970-N have a generally circular shape with a diameter of 2.5 millimeters. In one embodiment, holes 970-1 through 970-N also enable heat to dissipate from within shield 900. First portion 924 and sixth portion 914 are foldable with respect to each other along a line 986. Sixth portion 914 is adjacent to a seventh portion 910 of the shield 900.

Seventh portion 910 and sixth portion 914 are foldable with respect to each other along a line 912. In one embodiment, seventh portion 910 has a hole 930 and a hole 932. Holes 930 and 932 are adapted to receive screws, bolts and other securing devices known by those skilled in the art and are further described below with respect to FIG. 16.

First portion 924 is adjacent to an eighth portion 978 of the shield 900. Eighth portion 978 has holes 988-1 through 988-R. Holes 988-1 through 988-R are designed to block particular frequencies from being emitted from shield 900. In one embodiment, holes 988-1 through 988-R have a generally circular shape with a diameter of 2.5 millimeters. In one embodiment, holes 988-1 through 988-R also enable heat to dissipate from within shield 900. First portion 924 and eighth portion 978 are foldable with respect to each other along a line 982. Eighth portion 978 also has holes 990-1 through 990-S. Holes 990-1 through 990-S allow heat to dissipate from within shield 900. In the particular embodiment shown in FIG. 9, the holes 990-1 through 990-S have a generally square shape. Eighth portion 978 is adjacent to a ninth portion 908 of the shield 900.

Ninth portion 908 and eighth portion 978 are foldable with respect to each other along a line 976. In one embodiment, ninth portion 908 has a hole 972 and a hole 974. Hole 972 and hole 974 allow a user to see inside shield 900 after a radio card is encapsulated within the shield 900. In one embodiment, the radio card is a wireless interface circuit 310 of FIG. 3. In one embodiment, hole 972 and hole 974 also enable heat to dissipate from within shield 900. Ninth portion also has holes 952, 954, 956 and 958. Holes 952, 954, 956 and 958 are adapted to receive screws, bolts and other securing devices known by those skilled in the art and are further described below with respect to FIG. 16.

Figure 10:
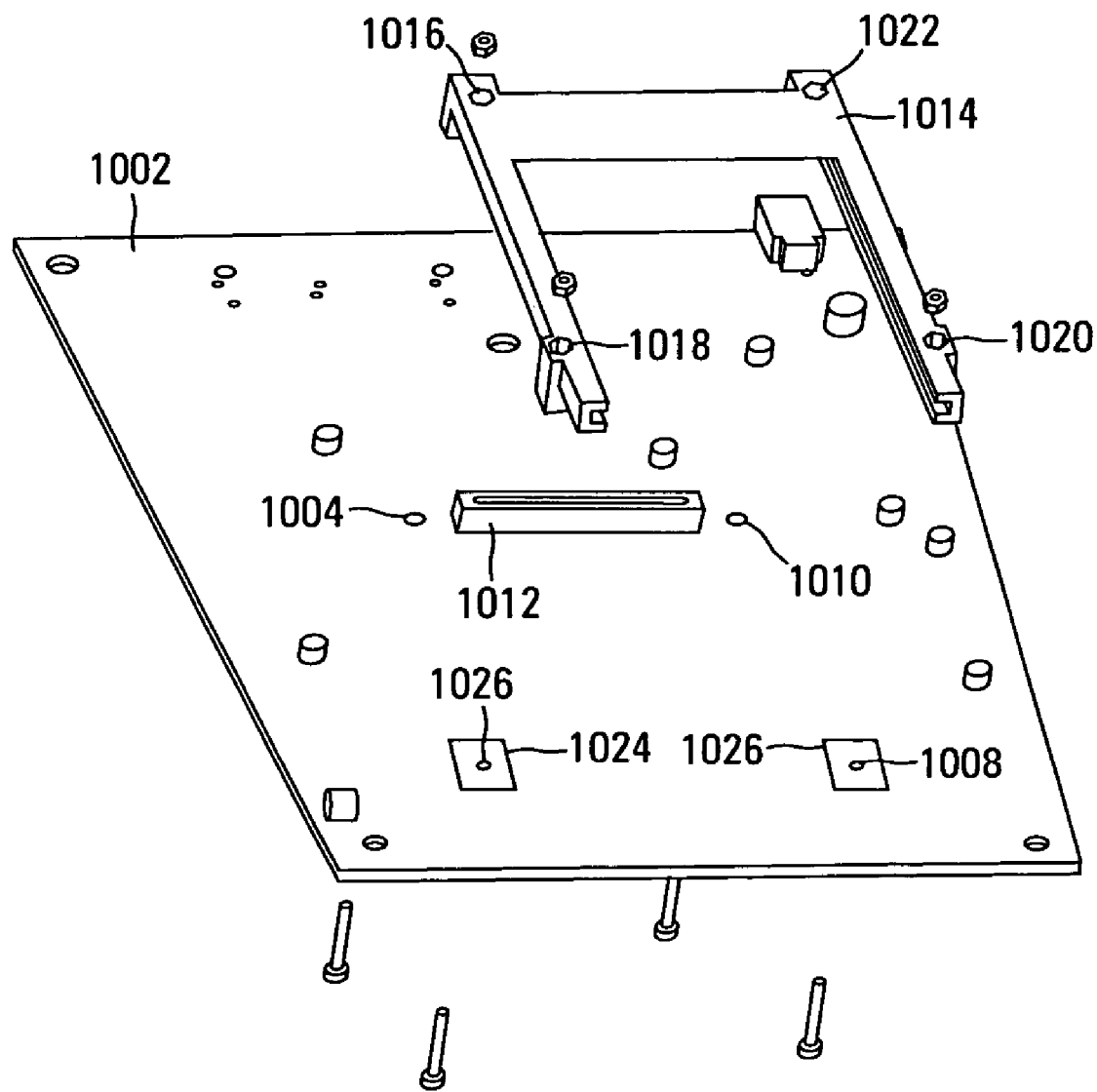
FIG. 10 is a view of a circuit board and a connector of one embodiment of the present invention.

FIG. 10 is one embodiment of a circuit board 1002 and a connector 1014. Circuit board 1002 comprises a board header 1012. In one embodiment, circuit board 1002 is as described above with respect to network interface circuit 602 of FIG. 6. Board header 1012 is adapted to communicate with connector 1014. Circuit board 1002 also comprises holes 1004, 1006, 1008 and 1010. Holes 1004, 1006, 1008 and 1010 are adapted to receive screws or other attachment means. Connector 1014 comprises holes 1016, 1018, 1020, and 1022. Holes 1016, 1018, 1020, and 1022 are adapted to receive screws, bolts and other securing devices known by those skilled in the art.

When the shield 900 is attached to the circuit board 1002, connector 1014 mates with header 1012 of circuit board 1002. When connector 1014 is mated with header 1012, holes 1016, 1018, 1020, and 1022 line up with holes 1004, 1006, 1008 and 1010 respectively. Screws or other securing devices are inserted into holes 1004, 1006, 1008 and 1010 and nuts secure the ends of the screws protruding out of holes 1016, 1018, 1020, and 1022 respectively. This secures the connector 1014 to the circuit board 1002.

Figure 11:
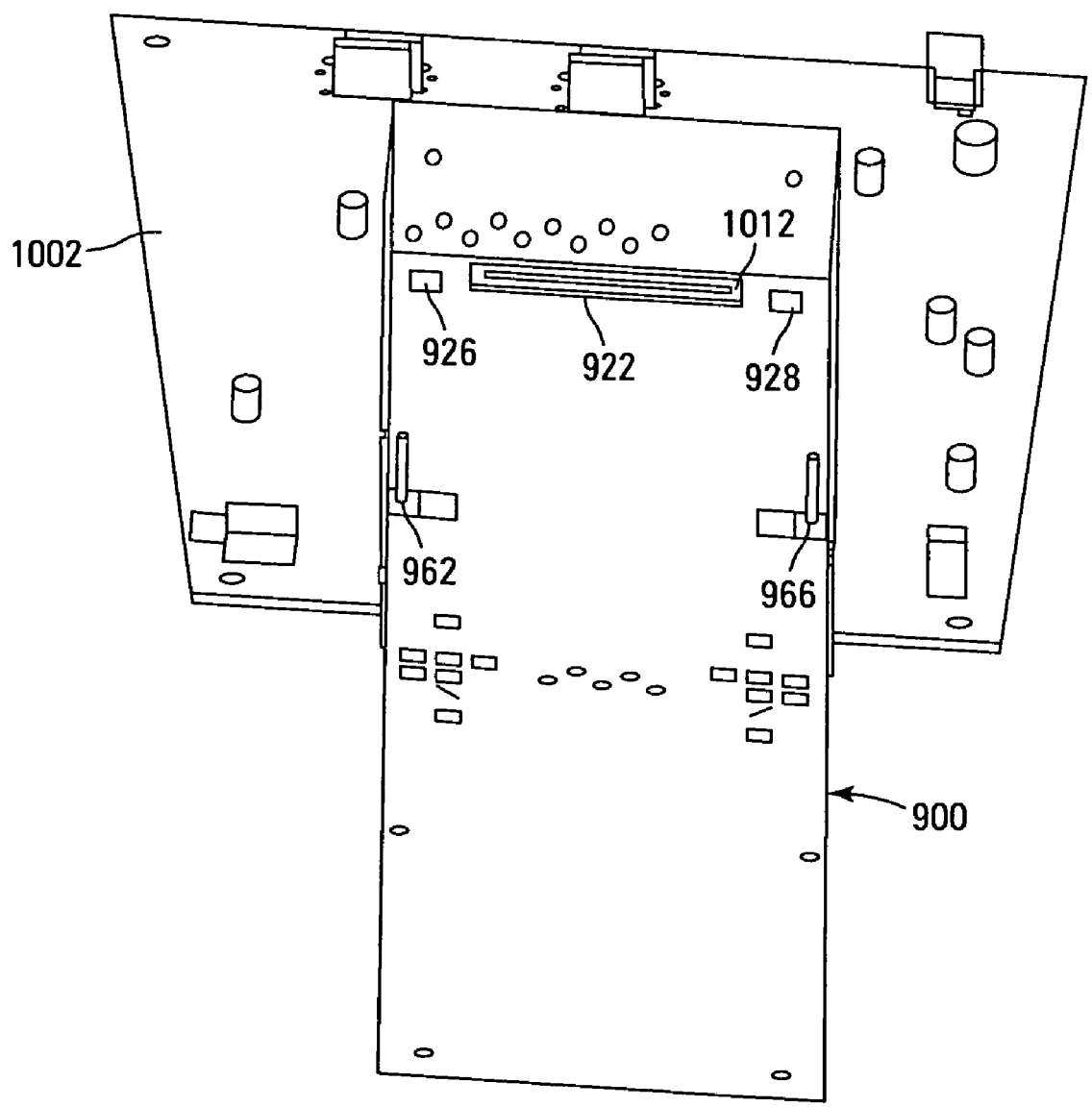
FIG. 11 is a view of a circuit board and of one embodiment of the present invention.

Circuit board 1002 further comprises ground pads 1024 and 1026. Ground pads 1024 and 1026 provide an electrical ground and are adapted to abut tabs 962 and 968 of FIG. 9 when shield 900 is abutting circuit board 1002 as shown in FIG. 11 below. When ground pads 1024 and 1026 abut tabs 962 and 968 shield 900 is grounded.

FIG. 11 is one embodiment of circuit board 1002 and shield 900. In this embodiment, the non-conducting side of shield 900 is adjacent to the circuit board 1002 and the conducting side of shield 900 is substantially separated from the circuit board 1002 by the non-conducting side. Shield 900 is placed on circuit board 1002 so that holes 926, 928, 962, and 966 line up with holes 1004, 1010, 1006 and 1008 (not visible) respectively. In one embodiment, screws or other securing devices are inserted into holes 1004, 1010, 1006 and 1008 (not visible) and holes 926, 928, 962, and 966. Also, the board header 1012 of circuit board 1002 is inserted into the hole 922 of shield 900.

Figure 12:
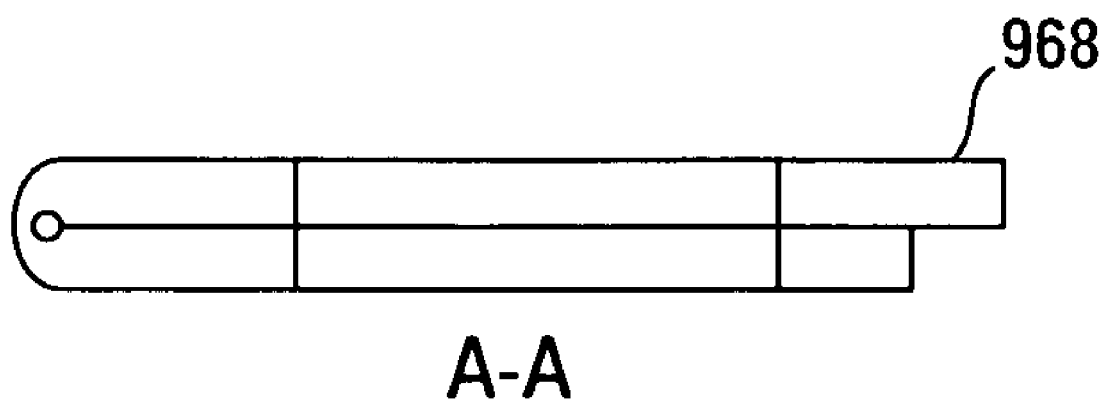
FIG. 12 is a cross-sectional view of one embodiment of a tab of FIG. 9 along line A-A.

FIG. 12 is a cross-sectional view of tab 968 of FIG. 9 along line A-A. Tab 968 is constructed by folding over a portion of shield 900 so that the exterior surfaces of tab 968 are conducting, and the interior surfaces are non-conducting. The interior surfaces of tab 968 are glued together or bonded by other materials known by those skilled in the art, holding the interior surfaces together. In one embodiment, tab 960 of FIG. 9 is constructed in a substantially similar way as tab 968.

Figure 13:
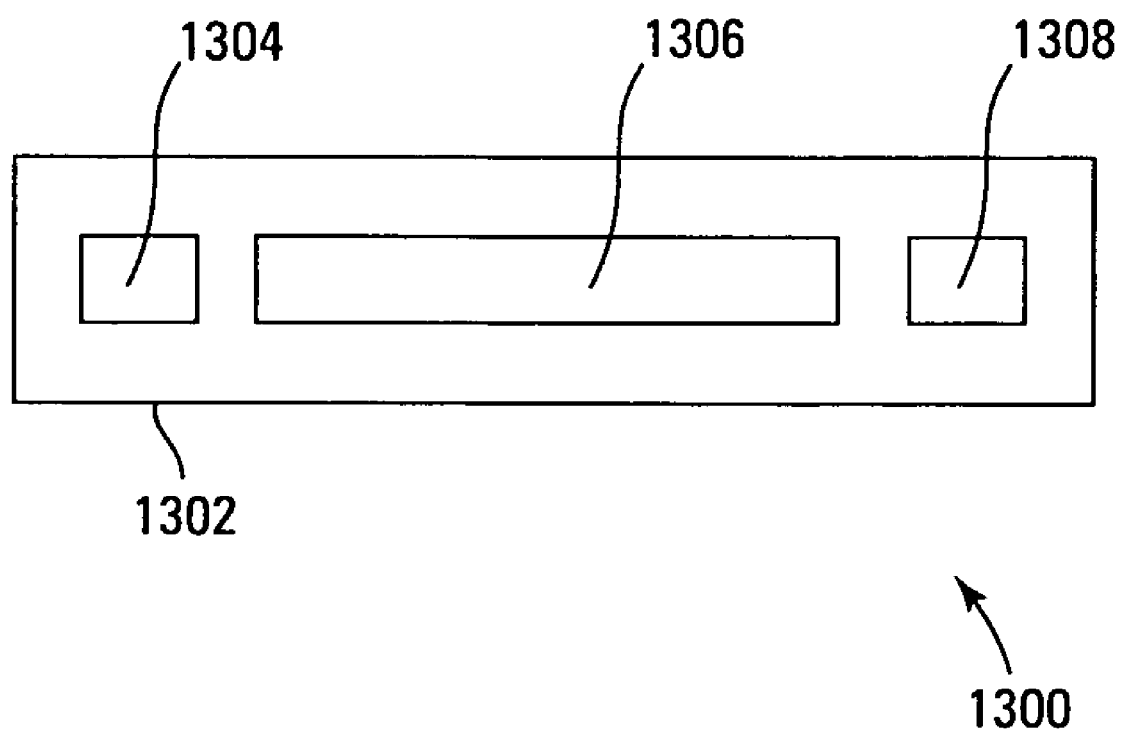
FIG. 13 is a view of a circuit board of one embodiment of the present invention.

FIG. 13 is one embodiment of an insulator shown generally at 1300. Insulator 1300 has a main portion 1302. Insulator also comprises a first hole 1304, a second hole 1306 and a third hole 1308. In one embodiment, insulator 1300 is placed on region 927 of FIG. 9. When insulator 1300 is placed on region 927 of FIG. 9, first hole 1304 substantially lines up with hole 926, second hole 1306 substantially lines up with hole 922 and third hole 1308 substantially lines up with 928. Insulator 1300 provides electrical insulation for components that fit in holes 922, 926 and 928. In one embodiment, insulator 1300 is secured to region 927 by adhesive. In another embodiment, insulator 1300 is placed on both sides of region 927 of first portion 924. In one embodiment, insulator 1300 is formed out of a sheet of material comprising a layer of Formex GK-5BK material.

Figure 14:
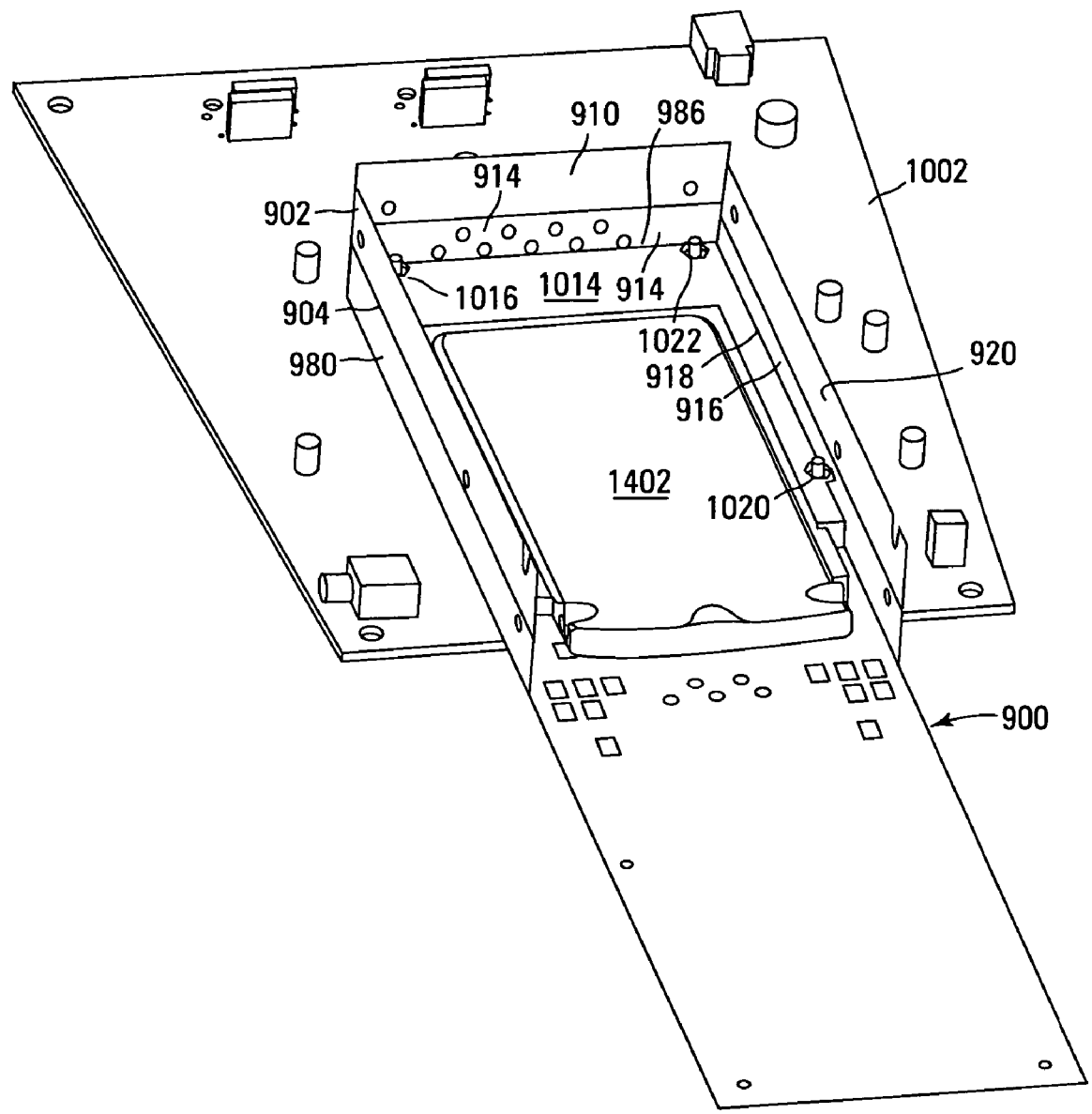
FIG. 14 is a view of an assembly of one embodiment of the present invention.
Figure 15:
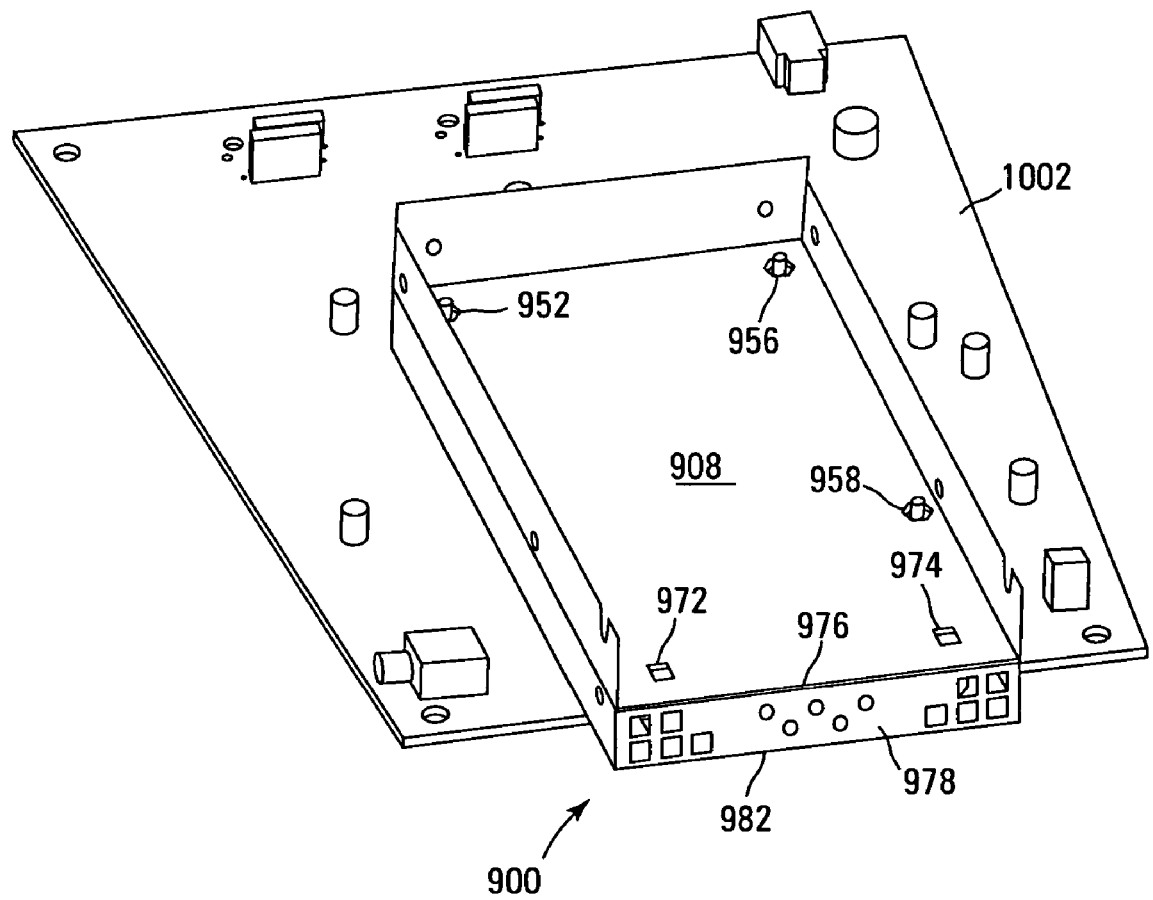
FIG. 15 is a view of an assembly of one embodiment of the present invention.
Figure 16:
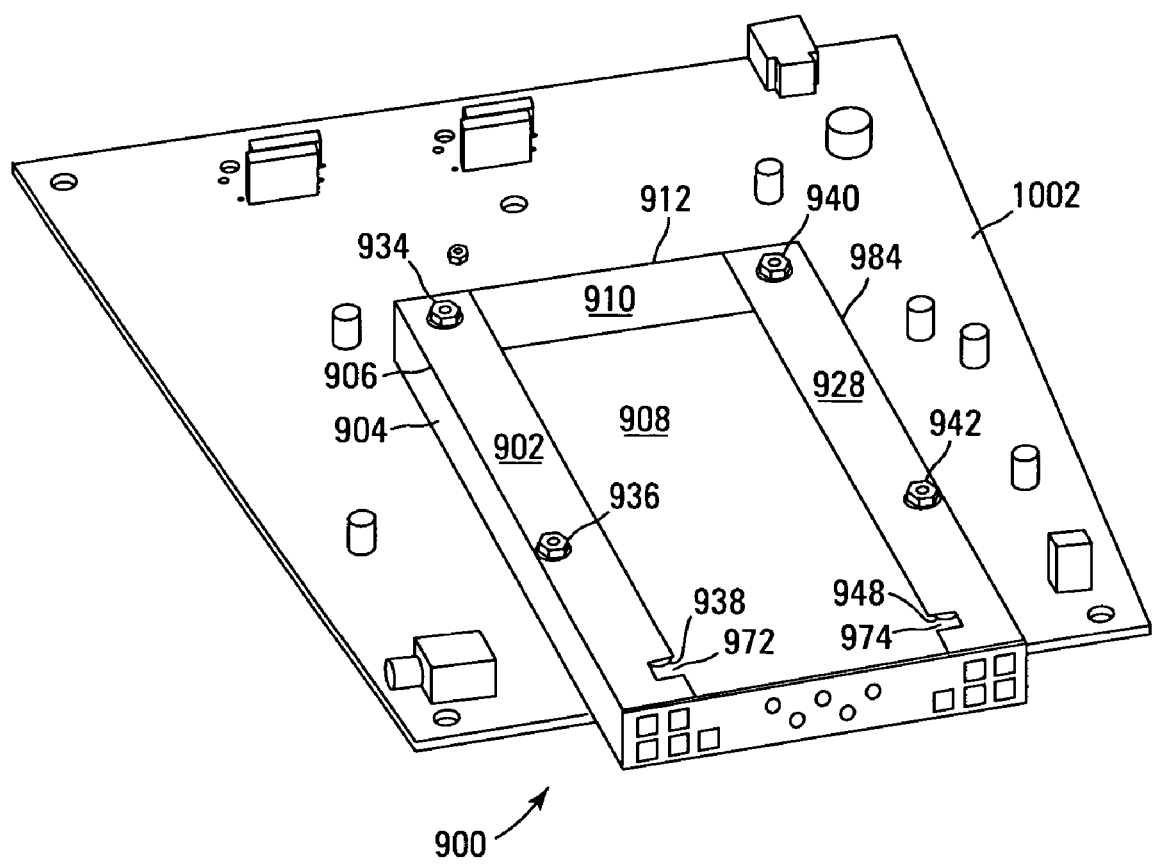
FIG. 16 is a view of an assembly of one embodiment of the present invention.

FIGS. 14 through 16 illustrate the attachment of the shield 900 of FIG. 9 to the circuit board 1002 of FIG. 10 and enclosure of a radio card 1402 within the shield 900. As shown in FIG. 14, shield 900 is placed on circuit board 1002 in an unfolded state as described with respect to FIG. 11. Connector 1014 is placed on shield 900 so that holes 1016, 1018 (not visible), 1020, and 1022 of connector 1014 line up with holes 926, 962, 966, and 928 (not visible) of shield 900 respectively. Holes 1004, 1006, 1008, and 1010 (not visible) of circuit board 1002 line up with holes 1016, 1018 (not visible), 1020, and 1022 of connector 1014 and holes 926, 962, 966, and 928 (not visible) of shield 900 respectively. These aligned holes are adapted to receive screws, bolts, nails or other forms of securing devices known by those skilled in the art. Connector 1014 is coupled to circuit board 1002 by mating the connector header (not visible) to board header 1012 (not visible).

Radio card 1402 is mated to connector 1014 via female connections (not visible) on radio card 1402 that are adapted to receive pins (not visible) on connector 1014. Second portion 904 of shield 900 is bent with respect to first portion 924 (not visible) along line 980 forming a first side wall adjacent to the first portion 924. Fourth portion 916 is bent with respect to first portion 924 (not visible) along line 918 forming a second side wall adjacent to the first portion 924. Sixth portion 914 is bent with respect to first portion 924 (not visible) along line 986 forming a third side wall adjacent to the first portion 924.

As shown in FIG. 15, eighth portion 978 is bent with respect to first portion 924 (not visible) along line 982 forming a fourth side wall adjacent to the first portion 924. Ninth portion 908 is bent with respect to eighth portion 978 along line 976 forming a top wall substantially parallel to the first portion 924 and substantially enclosing radio card 1402 (not visible). Holes 972 and 974 of ninth portion 908 line up with holes 946 and 964 (not visible) of first portion 924 respectively. Likewise, holes 952, 954 (not visible), 958, and 956 of ninth portion 908 line up with holes 1016, 1018, 1020, and 1022 (not visible) of connector 1014 (not visible) respectively.

As shown in FIG. 16, seventh portion 910 is bent with respect to sixth portion 914 (not visible) along line 912. This results in seventh portion 910 abutting ninth portion 908. Third portion 902 is bent with respect to second portion 904 along line 906. This results in third portion 902 abutting seventh portion 910 and ninth portion 908. Fifth portion 920 is bent with respect to fourth portion 916 (not visible) along line 984. This results in fifth portion 920 abutting seventh portion 910 and ninth portion 908.

Holes 930 and 932 (not visible) of seventh portion 910 line up with holes 952 and 956 (not visible) of ninth portion 908 respectively. Hole 934 of third portion 902 lines up with hole 930 (not visible) of seventh portion 910. Hole 936 of third portion 902 lines up with hole 954 (not visible) of ninth portion 908. Notch 938 of third portion 902 lines up with hole 972 of ninth portion 908. Hole 940 of fifth portion 920 lines up with hole 932 (not visible) of seventh portion 910. Hole 942 of fifth portion 920 lines up with hole 958 (not visible) of ninth portion 908. Notch 948 of fifth portion 920 lines up with hole 974 of ninth portion 908. Holes 934, 936, 940 and 942 are adapted to receive screws, and are secured by washers and nuts. Notches 938 and 948 allow a user to view connections made to radio card 1402 via holes 944 and 950.

The embodiment of a shield 900 shown in FIGS. 9-16 is especially well-suited for use in those situations where RF shielding is provided around a particular component or sub-assembly of a system or device while not providing RF shielding around the entire system or device (for example, because such system or device includes other components, such as an antenna, that are designed to intentionally emit RF signals).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A network interface device comprising:
   an enclosure having a first portion coupled to a second portion wherein the first portion and second portion have cavities;
   a removable case having a plate and a base wherein the plate is adapted to be coupled to the base;
   wherein the case is adapted to be removably disposed in the cavity of the second portion of the enclosure; and
   a network interface circuit disposed in the case, the network interface circuit adapted to provide communication to and from a network and to and from at least one customer premise equipment.

2. The network interface device of claim 1, wherein the network interface circuit contains a wireless interface and a wired interface for customer premise equipment.

3. The network interface device of claim 1, wherein the network interface circuit has a network interface port that is adapted to provide craft port access and network access.

4. The network interface device of claim 3, wherein the plate includes openings to provide access to the network interface port.

5. The network interface device of claim 1, further comprising a surge protector coupled to the network interface circuit and disposed in the second portion of the enclosure.

6. The network interface device of claim 5, further comprising a ground bracket coupled to the surge protector and the network interface circuit.

7. The network interface device of claim 6, wherein the surge protector is removable from the network interface device without disconnecting the network interface circuit from the ground bracket.

8. A network interface device with improved thermal properties, the network interface device comprising:
   an enclosure having a first portion coupled to a second portion wherein the first portion and section portion have cavities;
   a plate that separates the cavities of the first portion and the second portion;
   network interface circuitry disposed in the cavity of the second portion of the enclosure; and
   wherein the cavity of the first portion and the plate provide thermal insulation to the network interface circuitry.

9. The network interface device of claim 8, wherein the plate contains angled protuberances adapted to receive electrical leads from the network interface circuitry.

10. The network interface device of claim 8, wherein the network interface circuitry contains a wireless interface and a wired interface for customer premise equipment.

11. The network interface device of claim 8, further comprising a base disposed in the second portion of the enclosure, wherein the base is adapted to couple to the plate to form a case adapted to receive the network interface circuitry.

12. The network interface device of claim 9, wherein the first portion has a depth that is sufficient to allow the first portion to engage the second portion without interference from the angled protuberances.

13. A network interface device comprising:
   an enclosure having a first portion coupled to a second portion wherein the first portion and section portion have cavities;
   a removable case having a plate and a base wherein the plate is adapted to be coupled to the base;
   wherein the case is adapted to be removably disposed in the cavity of the second portion of the enclosure;
   a network interface circuit adapted to be received by the case;
   wherein the case containing the network interface circuit is able to be taken out without removing wiring or adding wiring; and
   wherein the case is adapted to be placed in another network interface device without removing wiring or adding wiring.

14. The network interface device of claim 13, further comprising a surge protector coupled to the network interface circuitry and disposed in the second portion of the enclosure and adjacent to the case.

15. The network interface device of claim 14, further comprising a ground bracket coupled to the surge protector and the network interface circuitry.

16. The network interface device of claim 15, wherein the surge protector is removable from the network interface device without disconnecting the network interface circuitry from the ground bracket.

17. A method of providing thermal insulation to network interface circuitry in a network device, the method comprising:
   placing the network interface circuitry within an internal housing that provides a layer of thermal insulation;
   placing the internal housing in a recess in an external housing; and
   creating an air gap between the external housing and the internal housing for another layer of thermal insulation.

\* \* \* \* \*